(12) United States Patent
Soldi et al.

(10) Patent No.: US 7,922,124 B2
(45) Date of Patent: Apr. 12, 2011

(54) POWER OPTIMIZED SYSTEM FOR ELECTRIC PROPULSION STATIONKEEPING GEOSYNCHRONOUS SPACECRAFT

(75) Inventors: James D. Soldi, Redondo Beach, CA (US); Andrew I. Mactavish, Hermosa Beach, CA (US)

(73) Assignee: The Boeing Company, Chicago, IL (US)

( * ) Notice: Subject to any disclaimer, the term of this patent is extended or adjusted under 35 U.S.C. 154(b) by 190 days.

(21) Appl. No.: 11/608,229

(22) Filed: Dec. 7, 2006

(65) Prior Publication Data

US 2008/0135685 A1 Jun. 12, 2008

(51) Int. Cl.
*B64G 1/10* (2006.01)
*B64G 1/26* (2006.01)
*B64G 1/44* (2006.01)
(52) U.S. Cl. .................... 244/158.8; 244/169; 244/172.7
(58) Field of Classification Search ............... 244/158.8, 244/158.6, 171.5, 171.1, 164, 158.4, 158.1, 244/169, 172.7
See application file for complete search history.

(56) References Cited

U.S. PATENT DOCUMENTS

| | | | | |
|---|---|---|---|---|
| 6,027,076 | A * | 2/2000 | Krause | 244/158.1 |
| 6,135,394 | A * | 10/2000 | Kamel et al. | 244/158.8 |
| 6,317,661 | B1 * | 11/2001 | Bruno et al. | 244/158.8 |
| 6,341,749 | B1 | 1/2002 | Ocampo | |
| 6,439,507 | B1 * | 8/2002 | Reckdahl et al. | 244/158.8 |
| 6,581,880 | B2 | 6/2003 | Randolph et al. | |
| 6,845,950 | B1 * | 1/2005 | Goodzeit et al. | 244/158.6 |

OTHER PUBLICATIONS

Croci et al., "Influence of Ion Propulsion System (IPS) on the Electrical Power System Sizing", 1997, NASA Astrophysics Data System, Proceedings of the Second European Spacecraft Propulsion Conference, May 27-29, 1997 (ESA SP-398, Aug. 1997) pp. 619-625.*

* cited by examiner

*Primary Examiner* — Tien Dinh
*Assistant Examiner* — Richard R Green
(74) *Attorney, Agent, or Firm* — Canady & Lortz LLP; Bradley K. Lortz

(57) ABSTRACT

Systems and methods are disclosed employing electric propulsion stationkeeping in a cyclical manner to better match the cyclical pattern of power generated by the solar array system. For a typical orbit design, e.g. a geostationary orbit, North-South stationkeeping can be intermittently suspended, tolerating some additional drift but yielding in a very significant reduction in the required solar power system. If necessary, stationkeeping can be supplemented with a chemical thrusters during off periods for the electric propulsion. Because of this, the overall electrical power margin for the solar array system design can be reduced without compromising the mission performance.

13 Claims, 3 Drawing Sheets

POWER OPTIMIZED SYSTEM FOR ELECTRIC PROPULSION STATIONKEEPING GEOSYNCHRONOUS SPACECRAFT

BACKGROUND OF THE INVENTION

1. Field of the Invention

This invention relates to spacecraft propulsion orbit control. Particularly, this invention relates to geosynchronous satellites employing electric propulsion systems for station keeping orbital control.

2. Description of the Related Art

Spacecraft such as communications satellites now commonly utilize electric propulsion for stationkeeping and other functions. Electric propulsion, such as ion thrusters utilize electrical power generated by the solar cells of the satellite to supply energy to a propellant to generate the propulsion. In general, ion thrusters possess a high specific impulse, making them extremely efficient requiring very little propellant for the thrust produced. Consequently, ion thrusters require relatively small amounts of a consumable propellant. This yields a significant advantage over conventional thrusters employing chemical constituents which react together to generate thrust.

Electric propulsion is the acceleration of propellants by electrical heating or electromagnetic forces. For example, ionized gas may be accelerated through an electric field across charged grids. The electrically accelerated particles can achieve speeds of approximately 30 km/second. The gas used is typically a noble gas, such as Xenon, for electromagnetic systems, and monopropellant for electrothermal systems. The principal advantage afforded by electric propulsion systems over conventional chemical propulsion systems is their very high efficiency. For example, with the same amount of fuel mass an ion propulsion system can achieve a final velocity as much as ten times higher than that obtainable with a chemical propulsion system.

Stationkeeping and momentum dumping on spacecraft, such as communications satellites, can require many hundreds of kilograms of propellant for conventional chemical thrusters. The use of electric propulsion systems has been applied to significantly reduce the mass of propellant needed. However, electric propulsion systems require additional electrical power to operate. Although additional electrical power can be generated from solar panels on-board the spacecraft, electric propulsion generally necessitates some additional solar array power, and thus additional solar array area, mass and cost.

U.S. Pat. No. 6,581,880 by Randolph et al., issued Jun. 24, 2003, discloses an electric propulsion device used to enable a stationkeeping satellite to track a prescribed stationkeeping Earth orbit. Electric propulsion propellant and electric power are throttled to vary the thrust and specific impulse of the electric propulsion device. A solar array provides electrical power during each Earth day cycle with excess power above that needed by the spacecraft stored by a battery. Software control manages the voltage, current and burn time to minimize propellant usage and impact to the system.

U.S. Pat. No. 6,341,749 by Ocampo, issued Jan. 29, 2002, discloses a method and apparatus for calculating an estimate of thrust vectors and burn times for an optimal two-burn orbit transfer from an inclined, eccentric initial orbit to a geostationary final orbit. A non-linear root finding algorithm is used to calculate the thrust vectors and burn times for the optimal two-burn orbit transfer. Thrust vectors and burn times are then computed for an optimal multi-segment orbit transfer from the initial orbit to the final orbit.

The system described in U.S. Pat. No. 6,581,880 takes advantage of times when there is excess solar array power to gain increased performance of the electric propulsion system. The system employs an electric propulsion system that can be throttled. To take full advantage of the system, it needs to have many different throttle settings, which adds hardware complexity, operational complexity, cost, and risk. In addition, the electrical power system for this and all conventional satellites employing electric propulsion are sized by a worst case day in the mission life using the electric propulsion system. Thus, in the prior art, the power system size is typically driven by the requirements of the electric propulsion system. As power system size continues to increase, strain is placed on the electrical power system in order to handle the additional power and current. Furthermore, it becomes more difficult to package the attitude control and structure system to support and control the larger solar array mass and area. In addition, the former system requires an electric propulsion system that can be throttled, with multiple throttle settings needed to take full advantage of the system. This feature adds hardware complexity, operational complexity, cost, and risk to the system.

In view of the foregoing, there is a need in the art for systems and methods to reduce the electrical power requirements when electric propulsion is employed. Furthermore, there is a need for in the art for attitude control systems and methods for that can be more easily packaged to support spacecraft solar arrays for spacecraft using electric propulsion without adding significant hardware complexity, operational complexity, cost, or risk. These and other needs are met by the present invention as detailed hereafter.

SUMMARY OF THE INVENTION

Embodiments of the present invention employ electric propulsion stationkeeping in a cyclical manner to better match the cyclical pattern of power generated by the solar array system. For a typical orbit design, e.g. a geostationary orbit, North-South stationkeeping can be intermittently suspended, tolerating some additional drift but yielding in a very significant reduction in the required solar power system. If necessary, stationkeeping can be supplemented with chemical thrusters during off periods for the electric propulsion. Because of this, the overall electrical power margin for the solar array system design can be reduced without compromising the mission performance.

A typical embodiment of the invention comprises a satellite including an electric propulsion system for performing stationkeeping using electrical power, a solar power system for generating the electrical power from solar energy, and a stationkeeping controller adapted to intermittently suspend performing stationkeeping with the electric propulsion system. In some cases, a chemical propulsion system can also be utilized in addition to the components listed. The solar power system may be sized such that the generated electrical power is insufficient to continuously power the electric propulsion system, e.g. over the life of the satellite. The stationkeeping controller may operate to suspend performing stationkeeping certain days or weeks in the year if the generated electrical power is insufficient to power the electric propulsion system. For example, the stationkeeping controller can suspend performing stationkeeping during a summer solstice condition. Further, the stationkeeping controller can suspend performing stationkeeping intermittently after the solar power system degrades such that insufficient power is generated to continuously power the electric propulsion system.

In further embodiments of the invention, the suspended stationkeeping of the electric propulsion system comprises North-South stationkeeping. For example, some spacecraft systems can accommodate less North-South stationkeeping control and allow up to five degrees North/South inclination drift.

In other embodiments of the invention, chemical thrusters may be used to supplement stationkeeping during the suspended stationkeeping of the electric propulsion system. For example, the chemical thrusters may be used for geostationary missions that can tolerate very little North-South drift. Thus, stationkeeping may be performed to maintain a geosynchronous orbit or a more constrained geostationary orbit.

Similarly, a typical method embodiment for controlling a satellite may comprise performing stationkeeping with an electric propulsion system using electrical power, generating the electrical power from solar energy using a solar power system, and intermittently suspending performing stationkeeping with the electric propulsion system using a stationkeeping controller. Method embodiments of the invention may be further modified consistent with the apparatus and systems described herein.

BRIEF DESCRIPTION OF THE DRAWINGS

Referring now to the drawings in which like reference numbers represent corresponding parts throughout.

DETAILED DESCRIPTION OF THE PREFERRED EMBODIMENT

1. Overview

Figure 1:
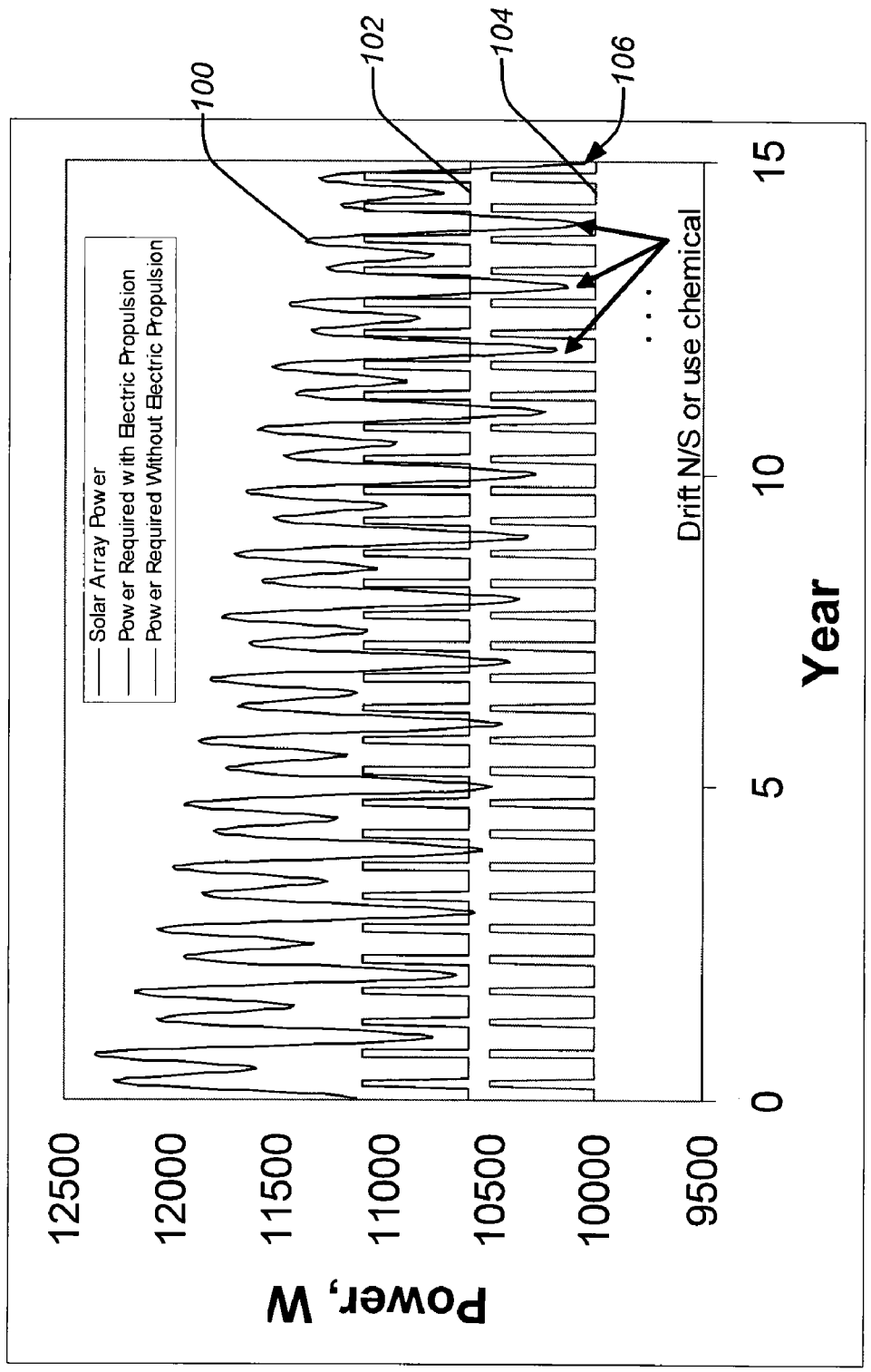
FIG. 1 illustrates the power requirements and available power for a typical satellite using electrical propulsion over the mission life.

In conventional satellites that employ chemical propulsion, large geostationary satellites typically require many hundreds of kilograms of propellant for North-South stationkeeping, East-West, stationkeeping, and momentum management. More recently, the use of electric propulsion systems have reduced this propellant requirement (on the order of one hundred kilograms), but at the cost of increasing the required solar array electrical power output by hundreds of watts. With typical solar array costs, this can result in increases of over $100Ks in solar array cost alone, and several square meters of additional array area that impacts the mass and the attitude control system.

For example, this is true for geostationary satellites which require the inclination be maintained near zero degrees (typically ±0.1 degrees). The North-South portion of the orbit control dominates the propellant usage, being roughly ninety percent of the velocity change (delta-v) required. Thus, the required energy for performing electric propulsion orbit control is also dominated by the North-South portion of the orbit control. Accordingly, it is the North-South stationkeeping requirements which drive the increase in solar array size.

However, some missions do not require the inclination to be maintained this close to zero degrees. Some classes of missions (e.g., non-geostationary, geosynchronous with partially inclined orbits) allow inclinations up to 4 or 5 degrees over a 15 year life for example. Although some North-South stationkeeping is required to keep the spacecraft from drifting outside of the wider allowed inclination range.

Embodiments of the invention can employ a system where the solar array size is much less affected by the use of electric propulsion on spacecraft, particularly where relatively large orbital inclinations (such as 4 or 5 degrees) are allowed. All of the mass advantage from fuel by using electric propulsion can be achieved at a much smaller penalty paid in solar array size, mass, and cost. In addition, for missions that require full North-South stationkeeping and have mass margins, a similar approach can be applied, using chemical propulsion on days when the power is not available for electric propulsion. Thus, the electrical power system size, mass and cost may be similarly reduced for these spacecraft applications as well.

Embodiments of the invention may effectively increase payload power capability by up to approximately 600 W over a conventional design approach. In addition, embodiments of the invention may reduce spacecraft cost by as much as $400K or more depending on power levels required. In a related manner, embodiments of the invention may also reduce launch vehicle cost due to spacecraft mass reduction. Further, increases in upper end power capabilities for satellite missions may be achieved. Thus, embodiments of the invention also enhance the options for employing electric propulsion in a broader application range.

It should also be noted that embodiments of the invention are not only applicable the ion fuel base electric propulsion (e.g., XIPS, Hall effect), but are applicable to all types of electric propulsion. For example, embodiments of the invention can also apply to arcjets which use monoprop fuel, which are electro-thermal systems and not usually considered ion thruster systems.

2. Electric Propulsion Power Requirements

FIG. 1 illustrates the power requirements and available power for a typical geosynchronous satellite using electrical propulsion over the mission life in accordance with the invention. For embodiments of the present invention, the solar array size can be determined by the payload and other bus system needs as if the spacecraft was not using electric propulsion for North-South stationkeeping. As shown in FIG. 1, the solar array electrical power output both degrades with the age of the array and varies cyclically with time of year (e.g., by season and sun angle). The delivered solar array power curve 100 shows a cyclical degrading pattern across the spacecraft life. The curve 100 begins with power generally above 11,500 Watts through the first year but dips to a lowest power point of approximately 10,750 Watts. In the fifteenth year of life the lowest power point dips as low as approximately 10,000 Watts. The required power curve 102 for the spacecraft including an electric propulsion system is shown in contrast to the required power curve 104 for the spacecraft without considering the electric propulsion system. As shown, electric propulsion requires a constant supply of as much as approximately 600 Watts of power.

It should be noted that the curves shown in FIG. 1 provide only one example application; actual power values can vary greatly for different spacecraft. The solar array power levels are not necessarily between 10,000 and 12,000 W. Embodiments of the invention can be applied over any range of power levels, e.g., from several kilowatts to tens of kilowatts. Embodiments of the invention are not limited to any specific power range.

Because solar array performance degrades over time, under a conventional design process the required size of the array is typically determined by the end of life power generated (the cyclically lowest point condition shown on curve 100 in FIG. 1). In the prior art, additional solar arrays would need to be added to increase curve 100 to ensure point 106, the minimum point on curve 100, is above the power level needed to support the electric propulsion station keeping curve 102. In the method of this invention, the array is only sized to stay above the power level needed by the lower curve 104. In the example, this occurs at the end of life summer solstice condition, with electric propulsion used for East-West and momentum control only (if necessary). Since the East-West and momentum control requirements are only roughly ten percent of the North-South portion, ninety percent of the solar array penalty and cost described above is avoided. Throughout most of the prior spacecraft life, there will be array power available in excess of this end-of-life condition. Electric propulsion is then used for North-South stationkeeping during early portions of the life and portions of the year when there is sufficient excess array power. In FIG. 1 the times when the required power curve 102 of the system with electric propulsion is below the generated solar array power curve 100 is when the North-South stationkeeping can be performed using the electric propulsion system. However, when the generated solar array power curve 100 is below that curve 102, no North-South stationkeeping is performed using electric propulsion. By sizing the array to this lower requirement, the full mass savings of electric propulsion system can be achieved, with only roughly ten percent of the mass, area, and cost penalty to the solar array compared to sizing the array to support the full electric propulsion operation at the end of life.

An extension of this technique can be further applied to missions that have mass margin available for additional chemical fuel, but are limited in the power subsystem size, and require full North-South stationkeeping over the entire mission life, such as a strict geostationary orbit. For these missions, the power subsystem may be sized to accommodate the power loads without considering the electric propulsion requirements. During periods where there is sufficient power for the electric propulsion, electric propulsion is used for stationkeeping. However, during periods where there is insufficient power for the electric propulsion, chemical propulsion may be used to supplement stationkeeping.

3. Power Optimization for Electric Propulsion Station Keeping

Figure 2:
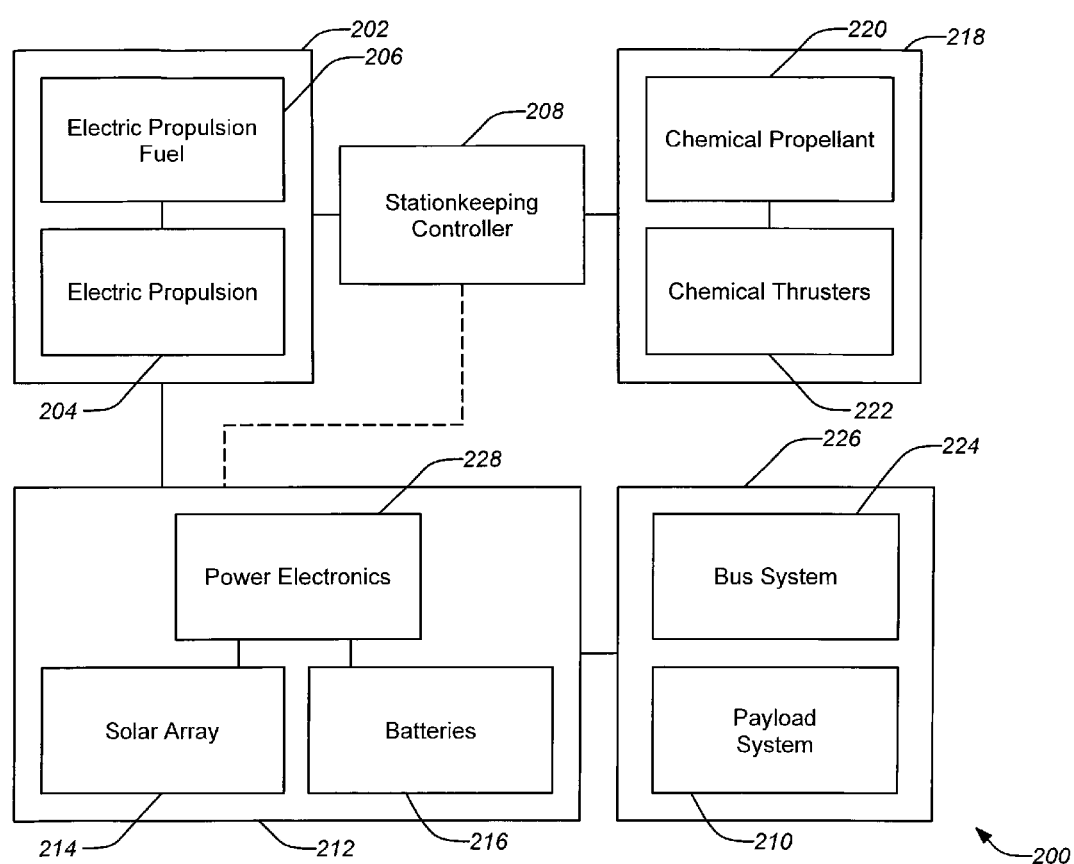
FIG. 2 is a block diagram of a satellite system employing an exemplary embodiment of the invention utilizing electric propulsion under reduced electrical power generation.

FIG. 2 is a block diagram of a satellite system 200 employing an exemplary embodiment of the invention utilizing electric propulsion under reduced electrical power generation. The electric propulsion system 202 comprises one or more electric propulsion thrusters 204 (e.g., ion thrusters operating on Xenon, Argon, etc.) as well as one or more fuel tanks 206 for the thrusters 204 and is coupled to a stationkeeping controller 208 which operates the thrusters 204 to maintain the proper orbit for the spacecraft. Stationkeeping by the electric propulsion thrusters 204 may comprise North-South stationkeeping as well as East-West stationkeeping. The electric propulsion thrusters 204 are appropriately disposed on the spacecraft to efficiently facilitated stationkeeping as will be understood by those skilled in the art.

The stationkeeping controller 208 may incorporate a variety of sensor input as will be understood by those skilled in the art. For example, the stationkeeping controller 208 may utilize and Earth and/or sun sensors as well as possibly star trackers or other devices to establish reference points from which to orient and maintain a precise orbit. In addition, beacons from ground stations may be similarly used to control stationkeeping of the satellite. An orbit determination system, such as a slant ranging system, is used to determine the spacecraft orbital parameters. Furthermore, operation of stationkeeping controller 208 may be supplemented through remote telemetry and commanding from ground station control. The typical stationkeeping controller planning of maneuvers to optimize fuel usage while meeting the orbital parameter requirements is augmented with an additional algorithm to perform maneuvers based on power availability and suspends the maneuvers if power is not available. Embodiments of the invention are not limited to any particular stationkeeping approach and may be employed with any known stationkeeping system or technique as will be understood by those skilled in the art.

Electrical power for both the electric propulsion system 202 as well as the other spacecraft loads, including various spacecraft systems 226 such as the spacecraft bus 224 and payload 210 (e.g., transponders for sending and receiving communication signals, sensors, etc.) is provided by the solar power system 212. The solar power system 212 for the spacecraft includes one or more solar arrays 214 which convert radiation from the sun into electrical power. In addition, the solar power system 212 typically includes batteries 216 to store electrical power as well as a voltage regulator and other supporting electronics 228. The solar power system 212 is coupled to both the payload 210 as well as the electric propulsion system 202 (in addition to all other electrical systems of the spacecraft 224). Embodiments of the invention may also incorporate coupling the solar power system 212 to the stationkeeping controller 208 to monitor power levels directly to determine when it is necessary to suspend stationkeeping with the electric propulsion system 202. In other embodiments, this determination can be simply based upon the time of year and orbital position according to a power generation schedule such as that shown in FIG. 1.

Furthermore, as previously mentioned, embodiments of the invention may also supplement stationkeeping operations through the use of a conventional chemical thruster system 218. The chemical thruster system 218 uses one or more chemical propellant tanks 220 (e.g., containing a monopropellant such as hydrazine or bipropellant constituents such as methane and oxygen or any other known conventional chemical propellant) which supply fuel to one or more suitable chemical thrusters 222 appropriately positioned on the satellite body to efficiently facilitate stationkeeping (as well as possibly other maneuvers). The chemical thruster system 218 is coupled to the stationkeeping controller 208 and invoked as necessary (e.g. when electric propulsion stationkeeping is temporarily unavailable) to maintain stationkeeping per the overall mission requirements. In some electric propulsion applications, such as certain electrothermal systems, the propellant used for the electric system can be the same as for the chemical system, thus sharing the propellant and tanks between the two systems.

It is important to note that no special configuration of the spacecraft subsystems is required to implement an embodiment of the present invention. With respect to the spacecraft configuration, embodiments are directed to a reevaluation and subsystem sizing that is made possible by virtue of the stationkeeping control operation previously described. Embodiments of the invention may be applied to any known spacecraft system configuration employing electric propulsion stationkeeping.

In a typical spacecraft employing electric propulsion, electric propulsion firing is performed a certain number of hours each day (e.g., for some systems such as XIPS) or each week (e.g., for other systems such as arcjets). Thus, embodiments of the invention may be applied to suspend electric propulsion for certain durations, and then resume later when power is available. For example, longer electric propulsion burn durations may be required to slowly correct for the times when the electric propulsion was suspended. For many conventional systems, the electric propulsion burn duration is only a few hours, so there will still be sufficient time in the day to make up for suspended periods on the days when power is available. Suspended periods of electric propulsion to support a stationkeeping cycle under the present invention indicates only that the electric propulsion is not being utilized at a scheduled time when it would otherwise be engaged under a standard stationkeeping schedule.

As will be understood by those skilled in the art, embodiments of the present invention essentially present a sizing optimization across distinct subsystems which are traditionally sized independent from one another and then implementing a set of control system hardware and software to manage the system. Beginning with the recognition that the peak requirement for an electric propulsion system occurs for only very short periods, designers either neglect considering these periods (if the mission can tolerate some additional drift) or supplement stationkeeping with conventional thrusters (if the mission cannot tolerate any additional drift). In the latter case, the spacecraft designer can directly trade additional mass, cost, etc. of the solar power system with the additional propellant mass, cost, etc. for supplemental stationkeeping with conventional thrusters.

Figure 3:
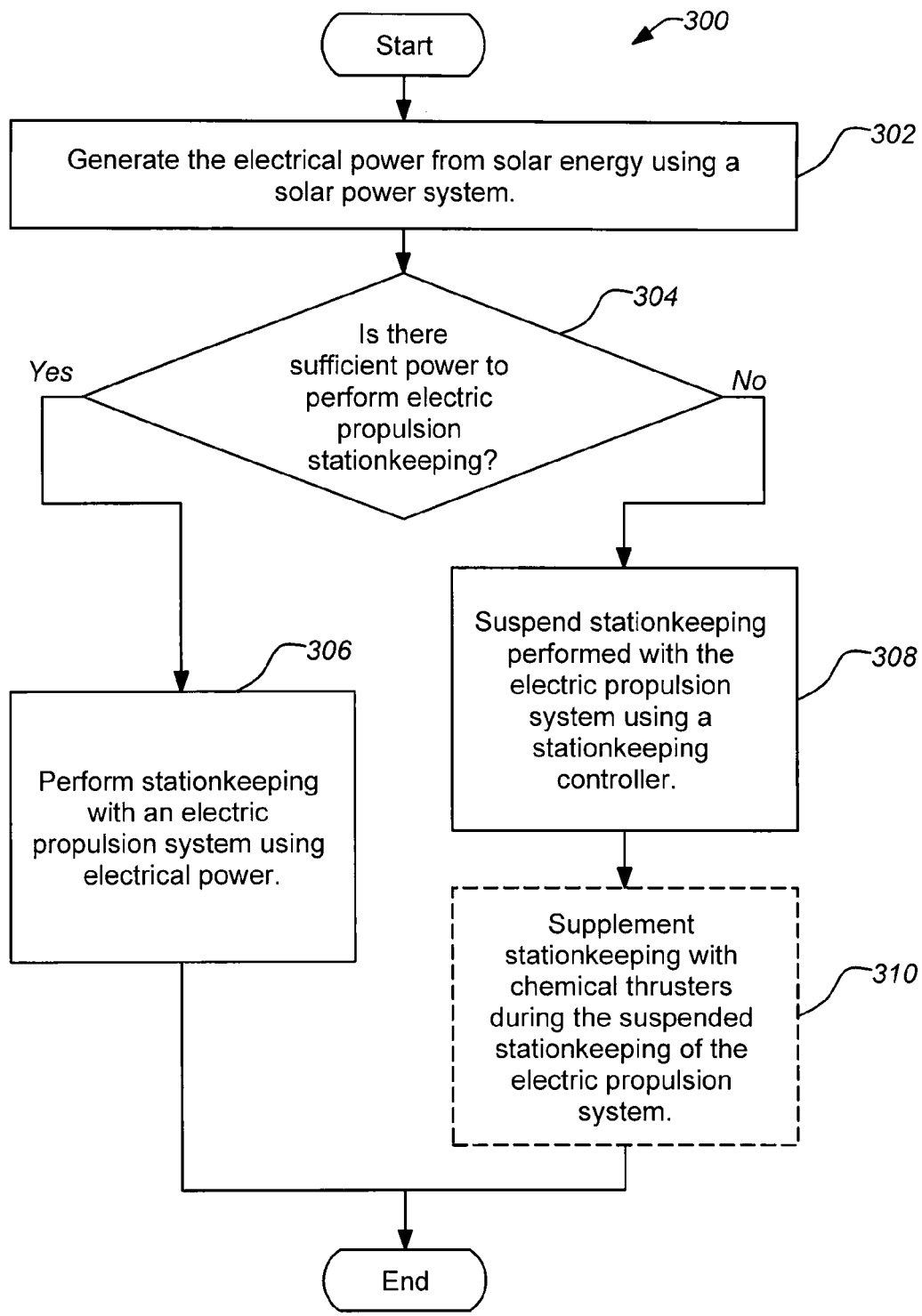
FIG. 3 is flowchart of an exemplary method embodiment of the invention for controlling a satellite utilizing electric propulsion under reduced electrical power generation.

FIG. 3 is flowchart of an exemplary method 300 of the invention for controlling a satellite utilizing electric propulsion under reduced electrical power generation. The method 300 begins will a satellite on orbit in operation 302 where electrical power is generated from solar energy using a solar power system in operation. At each time stationkeeping is performed, in operation 304 the stationkeeping controller determines if there is sufficient solar array power to support the electric propulsion systems. If there is sufficient power available, electric propulsion stationkeeping is performed in operation 306. If there is not sufficient power, electric propulsion is suspended by the stationkeeping controller in operation 308. In an optional operation 310, chemical thrusters may be used to supplement stationkeeping during the suspended stationkeeping of the electric propulsion system. These operations are then repeated for each stationkeeping cycle until the end of the satellite life is reached. The exemplary method 300 of the invention may be further modified consistent with the apparatus and systems described herein.

It should also be noted that the power and propulsion systems are appropriately sized in the satellite design based on power needed without the electric propulsion system as previously described with reference to FIG. 1. This can be done because the operations of method 300 are anticipated.

This concludes the description including the preferred embodiments of the present invention. The foregoing description has been presented for the purposes of illustration and description. It is not intended to be exhaustive or to limit the invention to the precise forms disclosed. Many modifications and variations are possible within the scope of the foregoing teachings as will be understood by those skilled in the art. Additional variations of the present invention may be devised without departing from the inventive concept as set forth in the following claims.

What is claimed is:

1. A satellite, comprising:
    an electric propulsion system for performing North-South stationkeeping cycles to maintain a geosynchronous orbit of the satellite using electrical power;
    a solar power system for generating the electrical power from solar energy; and
    a stationkeeping controller programmed to perform periods of the North-South stationkeeping cycles with the electric propulsion system at a frequency which reduces as the generated electrical power varies with available solar energy and as the solar power system degrades with age such that the generated electrical power is insufficient to power the electric propulsion system during previously performed periods of the North-South stationkeeping cycles and prior to end of life of the satellite;
    wherein the solar power system is sized such that the generated electrical power is insufficient to power the electric propulsion system during the previously performed periods of the North-South stationkeeping cycles after the solar power system degrades with age and prior to end of life of the satellite.

2. The satellite of claim 1, wherein the stationkeeping controller suspends performing the North-South stationkeeping cycles if the generated electrical power is insufficient to power the electric propulsion system.

3. The satellite of claim 1, wherein the stationkeeping controller suspends performing the North-South stationkeeping cycles during a summer solstice condition.

4. The satellite of claim 1, wherein the geosynchronous orbit of the satellite is allowed to drift up to 4 degrees of inclination.

5. The satellite of claim 1, wherein chemical thrusters are used to supplement stationkeeping during suspension of the North-South stationkeeping cycles of the electric propulsion system.

6. The satellite of claim 1, wherein the North-South stationkeeping cycles are performed to maintain a geostationary orbit of the satellite.

7. A method for controlling a satellite comprising:
    performing periods of North-South stationkeeping cycles to maintain a geosynchronous orbit of the satellite with an electric propulsion system using electrical power;
    generating the electrical power from solar energy using a solar power system; and
    using a stationkeeping controller to perform the periods of North-South station keeping cycles with the electric propulsion system at a frequency which reduces as the generated electrical power varies with available solar energy and as the solar power system degrades with age such that the generated electrical power is insufficient to power the electric propulsion system during previously performed periods of the North-South station keeping cycles and prior to end of life of the satellite;
    wherein the solar power system is sized such that the generated electrical power is insufficient to power the electric propulsion system during the previously performed periods of the North-South stationkeeping cycles after the solar power system degrades with age and prior to end of life of the satellite.

8. The method of claim 7, wherein the stationkeeping controller suspends performing the North-South stationkeeping cycles if the generated electrical power is insufficient to power the electric propulsion system.

9. The method of claim 7, wherein the stationkeeping controller suspends performing the North-South stationkeeping cycles during a summer solstice condition.

10. The method of claim 7, wherein the geosynchronous orbit of the satellite is allowed to drift up to 4 degrees of inclination.

11. The method of claim 7, wherein chemical thrusters are used to supplement stationkeeping during suspension of the North-South stationkeeping cycles of the electric propulsion system.

12. The method of claim 7, wherein the North-South stationkeeping cycles are performed to maintain a geostationary orbit of the satellite.

13. A satellite, comprising:
an electric propulsion means for performing periods of North-South stationkeeping cycles to maintain a geosynchronous orbit of the satellite using electrical power;
a solar power means for generating the electrical power from solar energy; and
a stationkeeping controller to perform the periods of North-South stationkeeping cycles with the electric propulsion system at a frequency which reduces as the generated electrical power varies with available solar energy and as the solar power system degrades with age such that the generated electrical power is insufficient to power the electric propulsion system during previously performed periods of the North-South stationkeeping cycles and prior to end of life of the satellite;
wherein the solar power means is sized such that the generated electrical power is insufficient to power the electric propulsion means during the previously performed periods of the North-South stationkeeping cycles after the solar power means degrades with age and prior to end of life of the satellite.

* * * * *